United States Patent Office 3,819,747

Patented June 25, 1974

3,819,747

HYDROGEN SULFIDE-MODIFIED EPOXY RESINS AND FLEXIBLE LAMINATES THEREFROM

James L. Bertram, Lake Jackson, Ross C. Whiteside, Jr., Angleton, and Preston H. Franke, Jr., Lake Jackson, Tex., assignors to The Dow Chemical Company, Midland, Mich.

No Drawing. Continuation-in-part of abandoned application Ser. No. 185,893, Oct. 1, 1971. This application Feb. 23, 1973, Ser. No. 335,380

Int. Cl. C08g 45/06

U.S. Cl. 260—830 TW 8 Claims

ABSTRACT OF THE DISCLOSURE

Mixtures of the diglycidyl ethers of a bisphenol such as bisphenol A and a diglycidyl ether of an aliphatic polyhydroxyl containing compound such as the diglycidyl ether of neopentyl glycol are modified with hydrogen sulfide to produce epoxy resins which when cured with an aminated polyglycol are useful in the preparation of flexible laminates.

This application is a continuation-in-part of our copending application Ser. No. 185,893, filed Oct. 1, 1971, now abandoned.

This invention relates to new epoxy resin compositions, cured products and flexible laminates prepared therefrom.

BACKGROUND OF THE INVENTION

The flexible electrical laminate industry is a relatively new art. Until a few years ago, the 1/16 inch hardboard had been the standard product in the electrical laminate field. In the last two to five years, a tremendous technicological boom has occurred with the advent of the ultrathin and multilayer board. The advantages of flexible circuitry include great savings in space, weight, and cost of assembly.

Relatively few materials are available which are suitable for use in flexible laminates. In general, three material types have been used for most flexible circuit device fabrication; FEP (polymers of fluorinated ethylene such as Teflon or fluorinated propylene copolymers thereof, polyester film (Mylar), and polyimide (Kapton) film. These are all unreinforced films. There is a need for reinforced films also. The industry is looking for a flexible epoxy resin/hardener system to be impregnated in a suitable substrate such as glass cloth, Reemay (spun Mylar), Nomex nylon paper, etc. In the case of FEP substrates, copper is heat bonded directly to the film without cladding adhesives. However, the thermal stability is bad with FEP. The 520° F. soldering temperature approaches the melting point of FEP. During soldering, complete loss of copper adhesion can occur as well as physical distortion of the circuitry device. Other FEP disadvantages include cold flows and low tensile strength. FEP advantages include excellent electrical properties, flame retardancy and good peel strength.

Polyester film substrates are metal cladded using a cladding adhesive. Excessive heat during soldering (520° F.) can cause film disorientation with a resultant loss of desirable properties. Mylar degrades at 425° F. When polyester film is dipped in molten solder, it immediately melts.

Another disadvantage besides the poor thermal stability is the minimal copper peel strength. Advantages include toughness, good electrical properties, good solvent and water resistance, and good flexibility.

At the present, no one is able to pass the rigorous thermal stability requirement except through the use of high priced polyimide (Kapton). Kapton film costs around $25.00 per pound.

The compositions of the present invention when cured with a polyglycol diamine give very good flexible laminate properties. Reemay (spun Mylar), glass, or Nomex nylon paper can be impregnated with the above formulation to give good properties.

Epoxy resins have been modified previously by reaction with hydrogen sulfide as taught in U.S. 2,633,458; however the epoxy resin compositions of the present invention have not previously been prepared. It is these hydrogen sulfide modified epoxy resin compositions of the present invention that make the flexible epoxy resin electrical laminates of the present invention possible. The examples herein will demonstrate that laminates prepared from the hydrogen sulfide modified epoxy resins of the prior art possess certain deficiencies such as one or more of the following, not readily capable of being B-staged, poor flexibility, delamination, and failure of a crease test hereinafter described.

DETAILED DESCRIPTION OF THE INVENTION

The epoxy resin compositions of the present invention comprise the reaction product of hydrogen sulfide with an epoxy resin mixture comprising (A) from about 40 to about 85 percent and preferably from about 50 to about 75 percent by weight based upon the combined weights of A and B of an epoxy resin represented by the general formulae

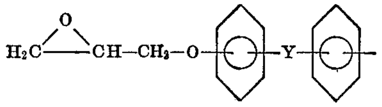

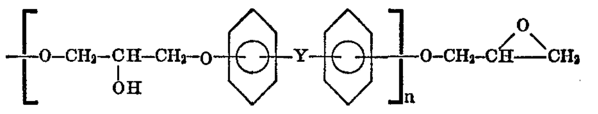

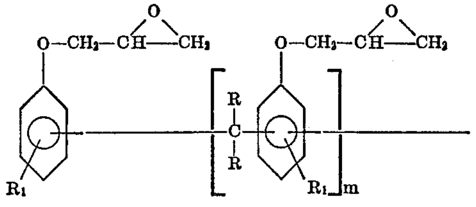

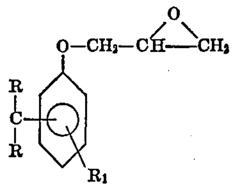

wherein each Y is independently a divalent hydrocarbon radical having from about 1 to about 6 carbon atoms, $$-S-,\ -S-S-,\ -\overset{O}{\overset{\|}{S}}-,\ -\underset{\underset{O}{\|}}{\overset{\overset{O}{\|}}{S}}-,\ -\overset{O}{\overset{\|}{C}}-,\ \text{and}\ -O-,$$

each R is independently hydrogen, methyl or ethyl, each $R_1$ is independently hydrogen or an alkyl group having from 1 to about 4 carbon atoms, *m* has an average value of from about 0.01 to about 2, and *n* has an average value of from about 0 to about 0.2.

(B) From about 15 to about 60 percent and preferably from about 25 to about 50 percent by weight based upon the combined weights of A and B of the diglycidyl ether of an aliphatic polyhydroxyl containing compound wherein the hydrogen sulfide is employed in quantities such that the

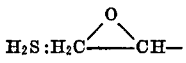

equivalent ratio is from about .20:1 to about .70:1 and preferably from about .25:1 to about .60:1.

Suitable glycidyl ethers of aliphatic polyhydroxyl containing compounds include the diglycidyl ethers of glycerine, neopentyl glycol and those represented by the formulae

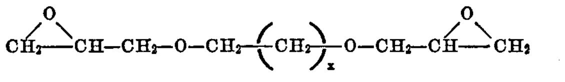

wherein *x* has a value of from 1 to about 5,

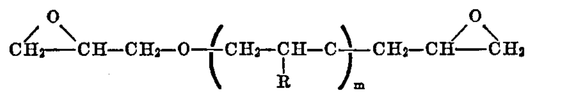

wherein each R is independently hydrogen, methyl or ethyl and *m* has an average value of from about 1 to about 25, preferably from about 1 to about 10.

The above described $H_2S$ modified epoxy resin compositions of the present invention are generally clear, straw-colored liquids to semi-solids.

The epoxy resin compositions of the present invention may be prepared by reacting the mixture of epoxy resins with hydrogen sulfide at a temperature of from about 25° to about 200° C. and preferably from about 60 to about 140° C. until all of the $H_2S$ has been reacted, usually from about 15 minutes to about 8 hrs., and preferably from about 30 to about 180 minutes in the presence of a suitable catalyst and in an inert atmosphere.

Suitable catalysts include the phosphonium salts of inorganic and organic acids including phosphonium halides, bromides, iodides, acetates and acetate-acetic acid complexes. These and other catalysts are taught in U.S. Pats. 3,477,990, 3,341,580 and Canadian Pat. 893,191.

They may be cured with any of the well known curing agents or catalysts such as, for example, primary, secondary or tertiary amines, polycarboxylic acids or anhydrides, Lewis acids, and the like, all of which are described in *Handbook of Epoxy Resins* by Lee and Neville, McGraw-Hill, 1967.

They may also be cured with the polyglycol amines as described later herein.

The epoxy resins of this invention may be employed as castings, adhesives, coatings, laminates and the like.

The epoxy resin compositions of the present invention when employed with a polyglycol amine are particularly useful in the preparation of laminates. These laminates may be unreinforced or reinforced with reinforcing materials such as, for example, fiberglass, nylon, rayon, cotton, polyester, and the like, and other suitable reinforcing media in porous forms, i.e., woven, spun, matt, etc., so as to be wettable by the resin-hardener mixture. These laminates may also be clad with metal sheets or foil such as, for example, copper, silver, aluminum and the like.

Particularly useful are the copper clad reinforced laminates which are employed as flexible circuit boards.

Also included in the present invention are the curable compositions comprising a mixture of (A) a hydrogen sulfide-modified epoxy resin as previously described, and
(B) a curing agent selected from the group consisting of a primary amine, a secondary amine, a tertiary amine, a polycarboxylic acid, a polycarboxylic acid anhydride, a Lewis acid and mixtures thereof.

When curing agents containing active hydrogens, the quantities of A to B are such as to provide an active hydrogen: epoxy equivalent ratio of from about 0.90:1.00 to about 1.25:1.00 and preferably from about 0.95:1.00 to about 1.05:1.00.

When catalytic type curing agents such as tertiary amines and Lewis acids are employed, they are employed in quantities of from about 2 parts to about 10 parts and preferably from about 3 parts to about 8 parts per 100 parts by weight of Component (A).

Suitable aminated polyglycols which may be employed in the present invention include, for example, those compounds represented by the following formula including mixtures thereof.

$$H_2N-\left(CH_2-\underset{R}{\underset{|}{CH}}-O\right)_n-CH_2-\underset{R}{\underset{|}{CH}}-NH_2$$

Each R is independently methyl or ethyl and wherein *n* has an average value of from about 2 to about 16 and preferably from about 2.5 to about 10.

These aminated polyglycols may be prepared by the procedures given in the patents U.S. 3,236,895 and French 1,547,228 which are incorporated herein by reference.

The above compositions may be B-staged, i.e. partially cured, to a tacky but self-releasable condition. This is advantageous in that metal clad laminates can be prepared by applying a sheet of metal to the B-staged resin and then completing the cure without the necessity of applying pressure to the laminate as is required in the laminates employing Mylar®, fiberglass, Nomex and the like. B-staging is a characteristic that is desirable by the flexible laminate industry.

The above compositions may be B-staged by heating at temperatures of from about 110° C. to about 170° C. for from about 4 to about 30 minutes and preferably for from about 120° to about 150° C. for from about 6 to about 12 minutes.

The B-staged resins may be completely cured by heating at temperatures of from about 110° to about 170° C. for from about 15 to about 60 minutes and preferably at about 120° to about 150° C. for from about 30 to about 45 minutes.

Other materials may be added to the compositions as desired and include fillers such as for example, calcium carbonate, aluminum powder, silica, asbestos, mica, diatomaceous earth, and the like; accelerators such as, for example, phenols, $BF_3$ complexes organic acids and anhydrides, and the like.

The following examples are illustrative of the present invention and are not to be construed as limiting the scope thereof in any manner.

In each of the examples, the epoxy resin or mixture of epoxy resins together with 0.05 percent by weight based upon the weight of the epoxy resin or epoxy resin mixture of ethyltriphenylphosphonium acetate-acetic acid complex catalyst was added to a suitable reaction vessel. After heating to about 130° C., the indicated quantities of hydrogen sulfide was bubbled into the vessel at the rate of about 0.25 l./minute. The vessel was then purged with nitrogen for about 30 minutes at about 130° C. The contents were then cooled and the physical properties of the resultant product obtained. The results are reported in Table I.

Each of the resins prepared as shown in Table I were mixed with a polyglycol amine and Reemay cloth (spun Mylar®) was dipped into the formulation and cured in an oven at 120° C. for 30 minutes. The resultant laminates were subjected to flexibility, tear resistance, water resistance and crease tests. The results are reported in Table II.

Additional samples of Reemay cloth dipped into each of the resin-polyglycol amine mixtures were B-staged by heating at about 120° C. for about 12 minutes after which a 1.5 mil thick copper sheet was rolled onto B-staged Reemay cloth by means of rubber rollers and then placed in an oven, without any outside pressure, and cured at about 120° C. for about 15 minutes. Each sample was subjected to copper peel strength and a 530° F. Solder Test. The results are reported in Table II.

TABLE I

| | Comparative Example | | | | | | | | | | | | | | |
|---|---|---|---|---|---|---|---|---|---|---|---|---|---|---|---|
| | A | B | C | D | Ex. 1 | Ex. 2 | Ex. 3 | Comp. Ex. E | Ex. 4 | Ex. 5 | Ex. 6 | Ex. 7 | Ex. 8 | Ex. 9 | Ex. 10 |
| D.E.R. ®331, gms | | 700 | 400 | 400 | 436 | 400 | 400 | 200 | 480 | 600 | 680 | 400 | 400 | 400 | |
| ENR, gms | | | | | | | | | | | | | | | 600 |
| DGEG, gms | | | | | | | | | | | | | 400 | | |
| DGEBD, gms | | | | | | | | | | | | | | 400 | |
| DGENPG, gms | 700 | | 400 | 400 | 436 | 400 | 400 | 600 | 320 | 200 | 120 | 400 | | | 200 |
| EEW of mixture before reaction with $H_2S$ | 130 | 188 | 154 | 154 | 154 | 154 | 154 | 141 | 152 | 169 | 177 | 154 | 169 | 157 | 157 |
| $H_2S$, gms | 33 | 17.5 | 8 | 77 | 23 | 31 | 61 | 33 | 34 | 27 | 28 | 41 | 17 | 36 | 24 |
| Equiv. ratio of $H_2S:H_2C\overset{O}{—}CH—$ | 0.36:1 | 0.28:1 | 0.09:1 | 0.86:1 | 0.24:1 | 0.34:1 | 0.68:1 | 0.34:1 | 0.38:1 | 0.34:1 | 0.36:1 | 0.46:1 | 0.21:1 | 0.41:1 | 0.27:1 |
| EEW of product after reaction with $H_2S$ | 214 | 244 | 169 | 1,900 | 214 | 249 | 530 | 223 | 256 | 270 | 291 | 300 | 220 | 321 | 221 |
| Ostwald viscosity in centistokes at 25° C | <200 | (1) | <200 | (1) | 1,420 | 3,500 | (1) | <500 | ~20,000 | ~15,000 | (1) | ~15,000 | <10,000 | <10,000 | <10,000 |

[1] Semisolid.

TABLE II

| | Comparative Example | | | | | | | | |
|---|---|---|---|---|---|---|---|---|---|
| | F | G | H | I | J | Ex. 11 | Ex. 12 | Ex. 13 | Ex. 14 |
| Epoxy resin, type/gms | Ex. A/21.4 | Ex. B/24.5 | Ex. C/16.9 | Ex. D/190 | Ex. E/22.3 | Ex. 1/21.4 | Ex. 2/24.9 | Ex. 3/53 | Ex. 4/25.6. |
| Polyglycol amine, type/gms | APG 1/12 | APG 1/12 | APG 1/12 | APG 1/12 | APG 1/12 | APG 1/12 | APG 1/12 | APG 1/12 | APG 1/12. |
| Percent resin in Reemay substrate. | N.D.[8] | 82.0 | 71.8 | 80.0 | N.D | 75.2 | 79.5 | 85.0 | 80.6. |
| Flexibility[1] | N.T.[7] | Very poor | N.T | Excellent | N.T | Excellent | Excellent | Excellent | Excellent. |
| Tear resistance[2] | N.T | 11.0, 9.8 | N.T | 3.8, 3.4 | N.T | 5.0, 4.3 | 6.0, 5.9 | 6.3, 5.1 | 3.5, 3.2. |
| Crease test[3] | N.T | Failed | N.T | Passed | N.T | Passed | Passed | Passed | Passed. |
| Water resistance[4] after 24 hrs | N.T | 1.8 | N.T | 3.1 | N.T | 3.0 | 2.7 | 3.1 | 3.3. |
| Copper peel strength[5], lbs./in. | Resin did not B-stage.* | 8.2 | Resin did not B-stage.* | 5.5 | Resin did not B-stage.* | 5.0 | 10.7 | 9.2 | 3.9. |
| 530° F. solder test[6], 20 sec. | | Failed (partial delamination bubbled). | | Failed (total delamination). | | Passed, not affected. | Passed, not affected. | Passed, not affected. | Passed, not affected. |

| | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|
| Epoxy resin, type/gms | Ex. 5/27 | Ex. 6/29.1 | Ex. 7/30 | Ex. 7/30 | Ex. 5/27 | Ex. 5/27 | Ex. 8/22 | Ex. 9/32 | Ex. 10/22. |
| Polyglycol amine, type/gms | APG 1/12 | APG 1/12 | APG 2/10.2 | APG 3/8.1 | APG 4/5.7 | APG 5/10 | APG 1/12 | APG 1/12 | APG 1/12. |
| Percent resin in Reemay substrate | 84.9 | 82.4 | N.D | N.D | N.D | N.D | 84.5 | 84.6 | 82.8. |
| Flexibility[1] | Excellent | Fair | Excellent | Good | Excellent | Excellent | Excellent | Excellent | Excellent. |
| Tear resistance[2] | 5.5, 4.5 | 5.8, 5.0 | 4.8 | 4.7 | 6 | 5 | 4.7 | 5.3 | 5.1. |
| Crease test[3] | Passed | Passed | Passed | Passed | Passed | Passed | Passed | Passed | Passed. |
| Water resistance[4] after 24 hrs | 2.9 | 1.9 | N.T | N.T | 3.8 | 4.0 | 10.2 | 5.6 | 3.1. |
| Copper peel strength[5], lbs./in. | Good (cohesive copper failure). | 3.9 | 10 | 8 | Good (cohesive copper failure). | Good | 7.8 | 6.4 | 9.7. |
| 530° F. solder test[6], 20 sec. | Passed, not affected. | Passed, not affected. | Passed, not affected. | Passed, not affected. | Passed, not affected. | Passed, not affected. | Passed, not affected. | Passed, not affected. | Passed, not affected. |

[1] Determination of Flexibility of Composite: Flexibility was determined by visual observation while bending the specimens. Samples were rated in flexibility as—

Excellent=Easily bent without resistance.
Good=Easily bent with slight resistance.
Fair=Easily bent with moderate resistance.
Poor=Sample very resistant to bending.
Very poor=Sample very rigid. Sample would crack before bending.

[2] Tear Resistance of Composite: ASTM D 1004 was used.

[3] Crease Test: The composite was creased over back and forth 10 times. It was noted if the specimen cracked or not. If it cracked, it failed, if it did not, it passed.

[4] Water Resistance Test: 1" x 3" strips of the composite were weighed on an analytical balance. The specimens were placed in distilled water at 25° C. for 24 hours. The samples were dried and reweighed. The amount of water absorption should be less than 5%.

[5] Copper Peel Strength Test: 1" x 4" Metal strips were treated with cleaning solution for 30 minutes to form a rough surface for adhesion purposes. Then a 1" x 4" copper-clad composite strip was glued to the metal strip using a conventional adhesive. A 1" section of copper was peeled away from the Reemay substrate at an angle of 90°. By use of an Instron machine, the 90° force required to peel the copper off was measured.

[6] 520° F. Solder Bath Test: The copper-clad laminate was dipped in a 520° F. solder bath for 20 seconds. It was noted if the sample delaminated or blistered. If delamination or blistering occurred, the specimen failed this test.

[7] N.T.=Sample not tested.

[8] N.D.=Not determined.

*Sample had insufficient reactivity and/or too low viscosity to make B-staging feasible. The substrates were too resin lean to give adhesion to copper foil. The resin/hardner mix ran off the substrate before it cured.

IDENTIFICATION OF MATERIALS

APG 1 is an aminated polypropylene glycol having an amine hydrogen equivalent weight of about 120 and an average molecular weight of about 400.

APG 2 is an aminated polypropylene glycol having an amine hydrogen equivalent weight of about 102 and an average molecular weight of about 250.

APG 3 is an aminated tripropylene glycol having an amine hydrogen equivalent weight of about 81 and an average molecular weight of about 190.

APG 4 is an aminated polypropylene glycol having an amine hydrogen equivalent weight of about 57.5 and a molecular weight of about 230 commercially available from Jefferson Chemical Company as Jeffamine D–230.

APG 5 is an aminated polypropylene glycol having an amine hydrogen equivalent weight of about 100 and a molecular weight of about 400 commercially available from Jefferson Chemical Company as Jeffamine D–400.

D.E.R.®331 is the diglycidyl ether of bisphenol A having an average epoxide equivalent weight of about 187–189 commercially available from The Dow Chemical Company.

DGENPG is the diglycidyl ether of neopentylglycol having an avg. epoxide equivalent weight of about 130.

DGEG is the diglycidyl ether of glycerine having an average epoxide equivalent weight of about 153.

DGEBD is the diglycidyl ether of 1,4-butanediol having an average epoxide equivalent weight of about 134.

ENR is a phenol-formaldehyde based epoxy novolac resin having an average epoxide equivalent weight of about 166 and an average functionality of about 2.1.

The preceding examples in addition to exemplifying the present invention demonstrate that:

(1) Diglycidyl ethers of aromatic hydroxyl containing compounds alone do not produce laminates which pass the Crease Test and Solder Test, see Comparative Examples B and G;

(2) Diglycidyl ethers of aliphatic hydroxyl containing compounds do not possess the desirable characteristic of B-stage capability, see Comparative Examples A and F.

(3) Quantities of the diglycidyl ether of an aromatic hydroxyl containing compound (Component A) below about 40% do not possess the desirable characteristic of B-stage capability, see Comparative Examples E and J.

(4)

$$H_2S:H_2C\underset{}{\overset{O}{—}}CH—$$

equivalent ratios below about 0.20:1 do not result in compositions which possess the desirable characteristic of B-stage capability, see Comparative Examples C and H.

(5)

$$H_2S:H_2C\underset{}{\overset{O}{—}}CH—$$

equivalent ratios above about 0.70:1 do not result in flexible laminates which pass the Solder Test, see Comparative Examples D and I.

We claim:

1. An epoxy resin composition comprising the reaction product of hydrogen sulfide with a mixture comprising (A) from about 40 to about 85 percent by weight based upon the combined weights of A and B of an epoxy resin represented by the general formulae

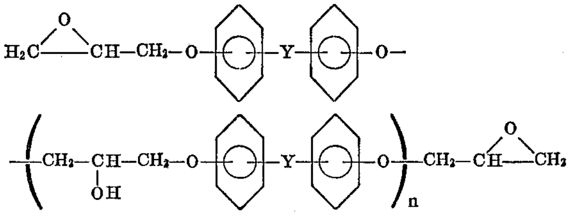

and

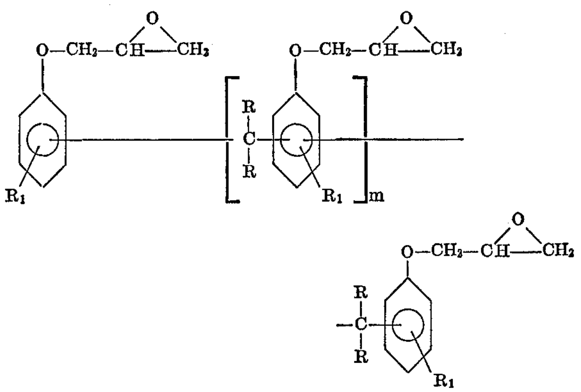

wherein Y is a divalent hydrocarbon radical

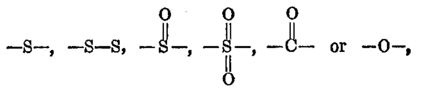

each R is independently hydrogen, methyl or ethyl, each $R_1$ is independently hydrogen or an alkyl group having from 1 to about 4 carbon atoms, *m* has an average value of from about 0.01 to about 2, and *n* has an average value of from about 0 to about 0.2, and (B) from about 15 to about 60 percent by weight based upon the combined weights of A and B of an aliphatic polyhydroxyl containing compound selected from the group consisting of a diglycidyl ether of neopentyl glycol, a diglycidyl ether of glycerine and those represented by the formulae

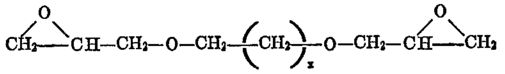

wherein *x* has a value of from 1 to about 5,

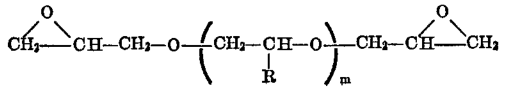

wherein each R is independently methyl or ethyl and *m* has an average value of from about 1 to about 25, preferably from about 1 to about 10; and wherein the quantity of hydrogen sulfide employed is that which will provide an

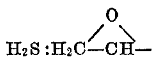

equivalent ratio of from about 0.20:1 to about 0.70:1.

2. The composition of Claim 1 wherein Component A is present in quantities of from about 50 to about 75 percent, Component B is present in quantities of from about 25 to about 50 percent and the

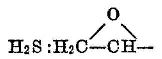

equivalent ratio is from about 0.25:1 to about 0.60:1.

3. The composition of Claim 2 wherein Component A is the diglycidyl ether of bisphenol A, an epoxy novolac resin or mixture thereof, and Component B is a diglycidyl ether of butanediol, glycerine, neopentyl glycol or mixtures thereof.

4. The composition of Claim 3 wherein Component B is the diglycidyl ether of neopentyl glycol.

5. The composition of Claim 4 wherein Component A is the diglycidyl ether of bisphenol A.

6. A cured composition comprising (A) an epoxy resin composition of Claim 1 and (B) an aminated polyglycol represented by the general formulae

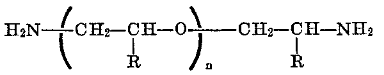

wherein each R is independently methyl or ethyl and wherein *n* has an average value of from about 2 to about 16.

7. A curable composition comprising the composition of Claim 1 and a curing agent therefor.

8. The composition of Claim 7 wherein the curing agent is an aminated polyglycol.

References Cited

UNITED STATES PATENTS

| | | | |
|---|---|---|---|
| 2,633,458 | 3/1953 | Shokal | 260—837 |
| 3,236,895 | 2/1966 | Lee et al. | 260—2 X |
| 3,355,512 | 11/1967 | De Acetis et al. | 260—47 X |

WILLIAM H. SHORT, Primary Examiner

T. E. PERTILLA, Assistant Examiner

U.S. Cl. X.R.

117—124 E, 132 BE, 138.8 F, 161 ZB; 161—184, 185, 186; 260—37 EP, 47 EP, 47 EN, 47 EA, 49, 59, 348 R, 835

PO-1050
(5/69)

UNITED STATES PATENT OFFICE
CERTIFICATE OF CORRECTION

Patent No. 3,819,747 Dated June 25, 1974

Inventor(s) James L. Bertram, et al.

It is certified that error appears in the above-identified patent and that said Letters Patent are hereby corrected as shown below:

In the formula at Col. 3, line 60 change the "C" inside and adjacent to the right hand parenthesis to --O--.

In col. 5, line 34, after "complexes" insert a comma --,--.

Signed and sealed this 8th day of October 1974.

(SEAL)
Attest:

McCOY M. GIBSON JR.
Attesting Officer

C. MARSHALL DANN
Commissioner of Patents